US009619283B2

United States Patent
Wu et al.

(10) Patent No.: US 9,619,283 B2
(45) Date of Patent: Apr. 11, 2017

(54) FUNCTION-BASED ACTION SEQUENCE DERIVATION FOR PERSONAL ASSISTANT SYSTEM

(71) Applicant: TCL RESEARCH AMERICA INC., San Jose, CA (US)

(72) Inventors: Hsin-Tai Wu, San Jose, CA (US); Xiaoli Song, San Jose, CA (US); Weilun Cheng, San Jose, CA (US); Yue Shang, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 0 days.

(21) Appl. No.: 14/810,778

(22) Filed: Jul. 28, 2015

(65) Prior Publication Data

US 2017/0031711 A1  Feb. 2, 2017

(51) Int. Cl.
*G06F 9/48* (2006.01)
*G06N 5/02* (2006.01)

(52) U.S. Cl.
CPC .......... *G06F 9/4881* (2013.01); *G06N 5/02* (2013.01)

(58) Field of Classification Search
None
See application file for complete search history.

(56) References Cited

U.S. PATENT DOCUMENTS

2013/0275164 A1* 10/2013 Gruber .................. G10L 17/22
705/5

2015/0286943 A1* 10/2015 Wang .................. G06F 3/04842
706/11
2016/0057207 A1* 2/2016 Li ...................... H04N 21/4431
709/203

FOREIGN PATENT DOCUMENTS

CN          103885968 A         6/2014

OTHER PUBLICATIONS

So-Jeong Youn et al. World Academy of Science, Engineering and Technology International Journal of Computer, Electrical, Automation, Control and Information Engineering vol. 1, No. 1, 2007 "Intention Recognition using a Graph Representation".*

* cited by examiner

*Primary Examiner* — Lechi Truong
*Assistant Examiner* — Abdou Seye
(74) *Attorney, Agent, or Firm* — Anova Law Group, PLLC (57) ABSTRACT

A method is provided for recommending a desired func sequence to a user. The method includes obtaining a user intention list including at least one user intention; separating the user intention into a plurality of tasks; and creating a task flow graph for the plurality of tasks based on user usage data. Each vertex in the task flow graph represents a task and indicating an importance of the task. The method also includes creating a func flow graph based on the user usage data and temporal sequences of the tasks and funcs, and each vertex in the func flow graph represents a func and indicating an importance of the func. Further, the method includes determining a desired func sequence to fulfill the user intention based on the user usage data, the task flow graph, and the func flow graph; and recommending the desired func sequence to the user.

18 Claims, 7 Drawing Sheets

FUNCTION-BASED ACTION SEQUENCE DERIVATION FOR PERSONAL ASSISTANT SYSTEM

FIELD OF THE INVENTION

The present invention generally relates to the field of information technology and user interface technologies and, more particularly, to methods and systems for user recommendation based on function.

BACKGROUND

The number of apps (short for applications) has grown exponentially. It becomes more challenging to help users manage the apps and better assist them to fulfill their intention with these apps. Instead of providing only one entry to an entire app, more app companies are opening up their APIs to allow a third party to have access to the functions in apps instead of the app as a whole. For example, when a user queries a search engine with "Panda Express", the search engine may offer the "Panda Express" page in Yelp instead of providing the entry to Yelp. Another example of accessing to function is when users take a photo, the users don't have to navigate through the WeChat entry and the search engine will provide us with the exact "take photo" page in WeChat. Thus, functions can be both informational and functional.

However, although the direct access to functions can potentially bring convenience to users, the tremendous number of functions makes it very hard to perform. Further, the existing recommendation systems often only recommend a single function page or an app, which makes it even harder for the user to find desired apps. The disclosed methods and systems are directed to solve one or more problems set forth above and other problems.

BRIEF SUMMARY OF THE DISCLOSURE

One aspect of the present disclosure includes a method for recommending a desired func sequence to a user. The method includes obtaining a user intention list including at least one user intention; separating the user intention into a plurality of tasks; and creating a task flow graph for the plurality of tasks based on user usage data. Each vertex in the task flow graph represents a task and indicating an importance of the task. The method also includes creating a func flow graph based on the user usage data and temporal sequences of the tasks and funcs, and each vertex in the func flow graph represents a func and indicating an importance of the func. Further, the method includes determining a desired func sequence to fulfil the user intention based on the user usage data, the task flow graph, and the func flow graph; and recommending the desired func sequence to the user.

Another aspect of the present disclosure includes a system for recommending a desired func sequence to a user. The system includes at least a memory for storing user usage data; and a processor coupled to the memory. The processor is configured to obtain a user intention list including at least one user intention; to separate the user intention into a plurality of tasks; and to create a task flow graph for the plurality of tasks based on the user usage data. Each vertex in the task flow graph represents a task and indicating an importance of the task. The processor is also configured to create a func flow graph based on the user usage data and temporal sequences of the tasks and funcs, with each vertex in the func flow graph representing a func and indicating an importance of the func; to determine a desired func sequence to fulfil the user intention based on the user usage data, the task flow graph, and the func flow graph; and to recommend the desired func sequence to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

According to the present disclosure, one approach to resolve the difficulty facing a large number of functions is to favor more frequently used functions, and to analyze the function usage pattern of large population of users to build ordered structure for the available functions.

Further, for most of the time, a user intention is often fulfilled by a function sequence instead of a single function. For example, when a user requests "I want to eat at Red Lobster", an ideal recommendation would be a function sequence: the OpenTable app to make seat reservation, the Uber app to make request to that specific place, and then the Yelp app to review page. That is, a function sequence over different apps instead of a single function or a single app may be desired to satisfy the user intention.

Accordingly, the present disclosure provides a function sequence recommendation model for deriving and ranking the function sequences based on the user text request and for recommending the user the desired or optimal function sequence to fulfill the user intention. The function sequence recommendation model can also be called FuncRank in short. More specifically, based on a function flow network of the user navigation history, the recommendation model may first compute a function importance model across the function flow network, and then to derive an optimal function sequence based on the generated function importance model and graph theoretical algorithms.

Figure 1:
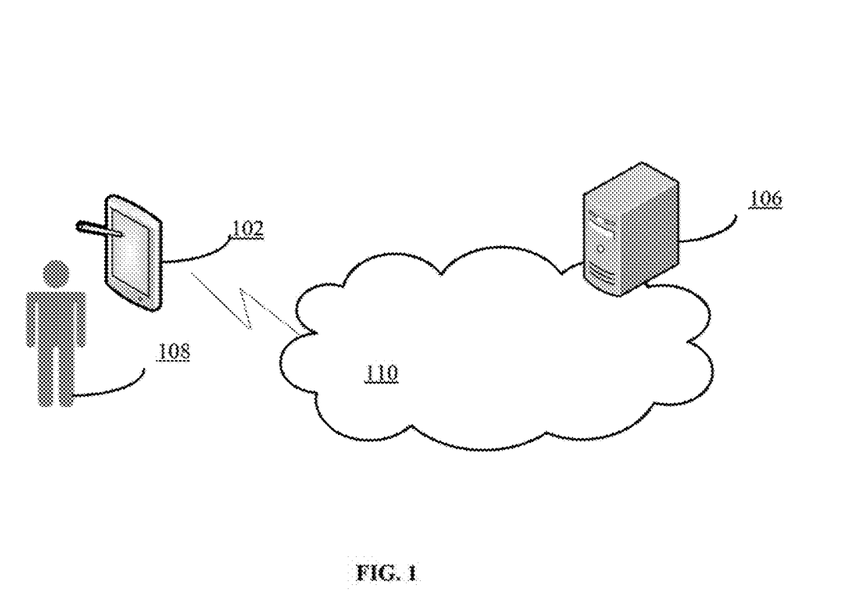
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a terminal 102, a server 106, a user 108, and a network 110.

Terminal 102 (also known as the terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. Terminal 102 may be implemented on any appropriate computing platform. Terminal 102 may be used by user 108 to connect to network 110 and make requests to server 106. The terminal 102 may obtain webpages from any appropriate sources, such as from a local storage device, from a wired or wireless network device of a service provider, or from the Internet.

Further, the server 106 may refer to one or more server computers configured to provide certain web server functionalities (e.g., search server). The server 106 may include one or more processors to execute computer programs in parallel. The server 106 may store webpages to be access by terminals, and each of these webpages has a unique web address. The unique web address is also called Uniform Resource Locator (URL). The server 106 may also provide various apps to the terminal 102 as requested by the user 108 and/or may make various recommendations to the user about the web pages and/or apps and app functions. The server 106 may also be a cloud server.

Terminal 102 and server 106 may communicate with each other through communication network 110, such as a cable network, a phone network, and/or a satellite network, etc. Although one terminal 102 and one server 106 are shown in FIG. 1, any number of terminals and/or network devices may be included.

Figure 2:
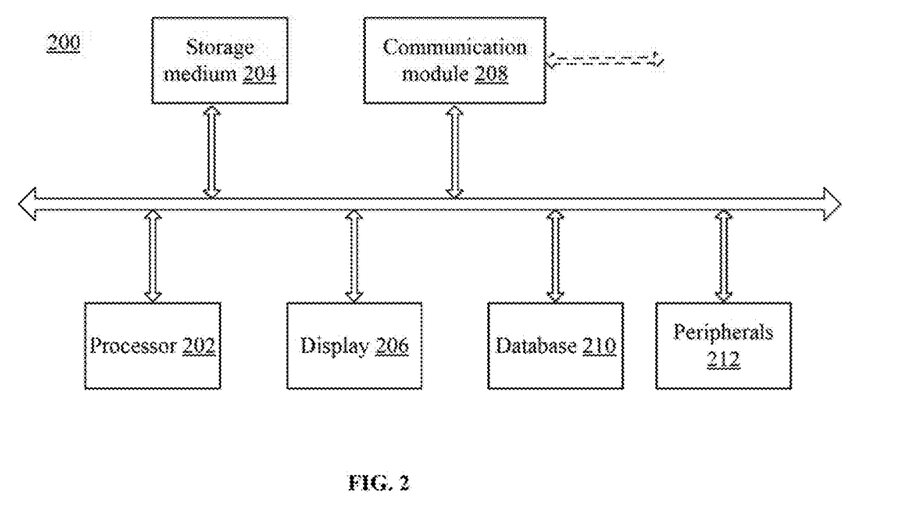
FIG. 2 illustrates an exemplary computing system consistent with the disclosed embodiments.

Terminal 102, and/or network device 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, user 108 may, through terminal 102 or a browser on terminal 102, intend to use certain applications (apps) or mobile apps available on the terminal 102 or online from various servers. A mobile app may have a home page or other direct access point that may be used to achieve a certain function. The mobile app access point may include an entrance to the function on the mobile device or web, a type of the function, and other relevant information, such as location, status, and nature of the function, etc. The function may include a native mobile app, a web app, and a customized function as a cloud application programming interface (API).

A native mobile app may refer to a mobile device application that is coded in a specific programming language for a particular operating system. The native mobile app is installed directly on a mobile device. A web app may refer to a website that is tailored to function via a web browser on a mobile device. The entrance to function and the type of the entrance may include a variety of configurations. For example, an access point may include a link to a web app page, a link to a customized function, a link or shortcut to an installed native app page, a link to a page of a compressed version of a native app, a link to the action of native app download and installation, and a link to an app guideline page that suggests the user to open an alternative app, etc.

For the sake of convenience, the term "FUNC" or "func" may be used to represent the access point of an app, i.e., a function of the app. Each func may be a function-level operation flow, which is associated with a function or service that satisfies a user's specific need. For a same need, different users may use different func in different mobile apps (for example, a user may use Facebook to share a picture, and another user may use WeChat for the same purpose) according to the user's habits or preferences. Because the func provides an entrance to a native app, a web app, or a customized function, the func may be used to make transition from one mobile app to the other mobile app to achieve a function sequence.

Based on the func concept, a functional flow of user's action can be built up more smoothly without using the app-level operations. The app-level operations refer to certain operations that are performed among multiple mobile apps or web services by frequently using the home page, and thus more user interactions (screen touches or key presses) may be required and it may be more difficult to implement a function sequence.

Figure 3:
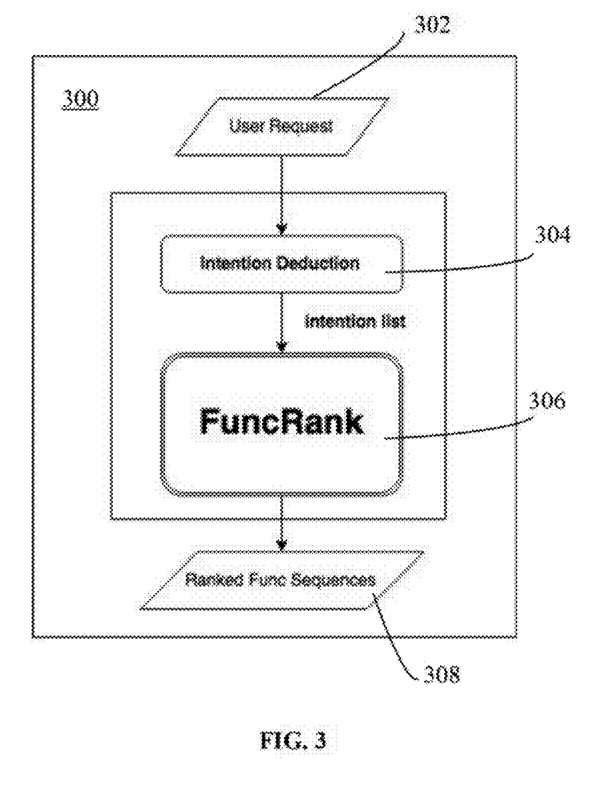
FIG. 3 illustrates a structure schematic diagram of an exemplary function recommendation system consistent with the disclosed embodiments.

Further, server 106 may provide a FuncRank recommendation system based on the FuncRank recommendation model (i.e., a recommendation model ranking the importance of the function) to make app recommendations to the user to fulfil a user request or inquiry. FIG. 3 illustrates an exemplary FuncRank recommendation system 300.

As shown in FIG. 3, the FuncRank recommendation system 300 may include an input module 302, a user intention deduction module 304, a FuncRank recommendation module 306, and an output module 308. Other modules may also be included.

The input module 302 may be provided to obtain a user request for apps to provide certain needs or functions, or to receive a user inquiry for apps to provide the certain needs or functions. The request or inquiry may be in any appropriate format, such as text format, voice format, image format, etc. The user intention deduction module 304 may be configured to take the user request (e.g., a text request) as input and output an intention list to be fed into the FuncRank recommendation module 306.

Further, the FuncRank recommendation module 306 may be configured to receive the user intention list as an input, and to derive and rank func sequences to fulfill the user intention. The output module 308 may be configured to present the ranked func sequences to the user. For example, the output module 308 may recommend the ranked func sequences to the user by display the recommendations on the browser or other places on the display screen of the terminal 102. The output module 308 may also provide the ranked func sequences to another application program for further processing.

The FuncRank recommendation module 306 may include a FuncRank model, a personalized graph based ranking algorithm to derive and rank the func sequences given the user intention list. The personalized top ranked func sequences may then be recommended to users to fulfill their intention. In other words, instead of ranking individual apps, the FuncRank model derives and ranks the func sequences, thus providing users with a personalized solution to meet their personal need.

Figure 4:
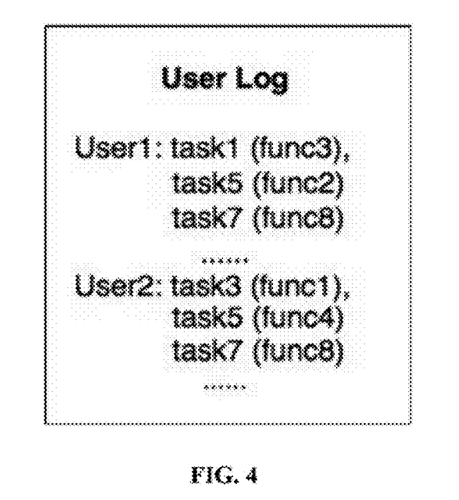
FIG. 4 illustrates an exemplary user log consistent with the disclosed embodiments.
Figure 5:
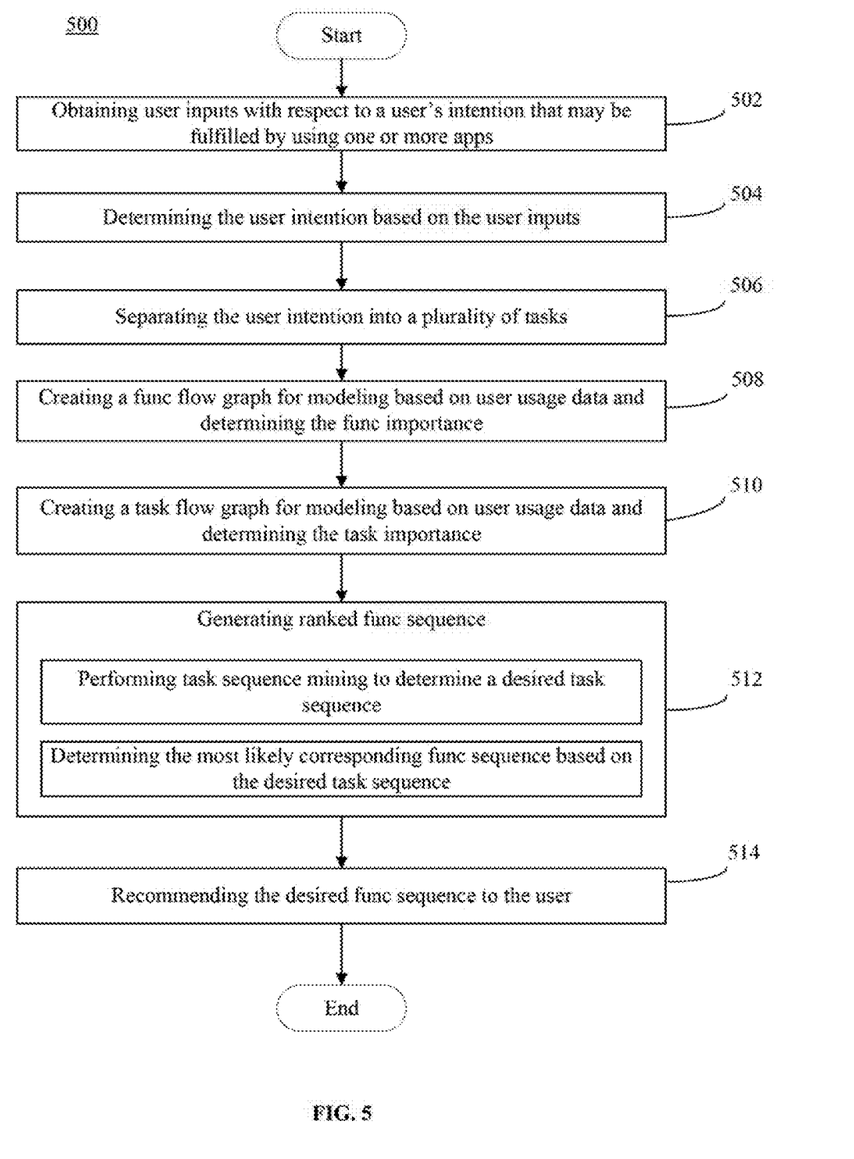
FIG. 5 illustrates an exemplary function sequence recommendation process consistent with the disclosed embodiments.

FIG. 5 illustrates a func sequence recommendation process consistent with the disclose embodiments. As shown in FIG. 4, at the beginning of the process, user inputs may be obtained with respect to user's intention that can be fulfilled by using one or more apps (502). Based on the user inputs, the user intention may be determined (504). For example, the user intention may include an intention list having one or more intentions, and the intention list is inputted into the FuncRank recommendation model.

Further, the user intention may be separated into a plurality of tasks, which is a basic unit in fulfilling a user intention (506). When the intention list includes more than one intentions, each intention may be processed independently and the processing results for each intention may be combined at the end of the processing. For example, a sequence of intentions deduced from user text request may be inputted to the FuncRank recommendation model.

The tasks for an intention may be predefined or may be defined in real-time. Also, the predefined tasks may be a fixed number of tasks or may be variable number of tasks to be combined for a particular intention. In other words, for each intention, the tasks to fulfill each intention have been pre-defined. For example, the "cooking at home" is an intention. To fulfill this intention, the tasks may include: "find a supermarket", "go to the supermarket", "buy the material", "pay", "go home", "find recipe", "prepare food" and "cooking".

Although the plurality of tasks are pre-defined, no particular order or sequence may be defined regarding the plurality of tasks. Thus, there may be multiple task sequences to fulfill each intention. That is, the plurality of tasks may implement multiple task sequences.

Each task can be implemented by one func or different funcs, while each func can fulfill one task or a set of tasks. For example, "taking photo" is a task, and can be implemented by "taking photo" function page either in "WeChat" or in "Poco Food Camera". Also for example, while "Panda Express" page in Yelp is a func, fulfilling both tasks of "dish review" and "find the address". Therefore, each intention is fulfilled by a set of tasks, while each task can be implemented by various funcs.

Thus, by driving task sequences based on the user intention, the func sequences can also be derived based on the user intention. For example, the user log may include temporal sequences of tasks and funcs that users choose to fulfill the tasks. Further, such deriving process may also be a continuous or active learning process. The more frequently the funcs and tasks are visited by the user, the more popular and important the funcs and tasks may become. The task and func importance learning is an active learning process, and the FuncRank recommendation module 306 may use a user log to record users and the tasks and corresponding funcs used by the user. FIG. 4 illustrates an exemplary user log.

As shown in FIG. 4, User1 used task1 and corresponding func3, tasks5 and corresponding func2, and task7 and corresponding func8, etc. User2 used task3 and corresponding func1, task5 and corresponding func4, task7 and corresponding func8, etc.

Thus, during the learning process of the FuncRank model, it may start with limited user selected funcs and tasks traversal links, more real user usage data is then obtained from the user log as shown in FIG. 4. The real usage data is then fed into the learning process for more accurate personalization.

Figure 6:
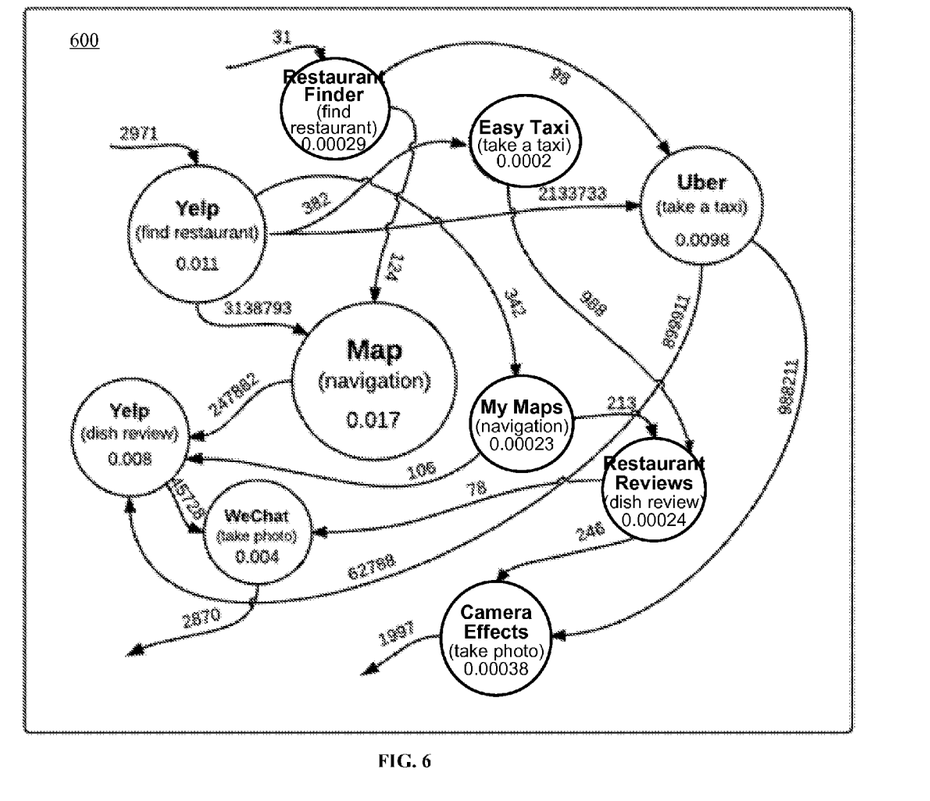
FIG. 6 illustrates an exemplary function flow graph consistent with the disclosed embodiments.

Returning to FIG. 5, after the intention is separated into tasks, a func flow graph may be created for modeling based on user usage data (508). FIG. 6 illustrates an exemplary func flow graph for a user intention related to, for example, going out to a restaurant. The func flow graph may be created based on user usage data, such as user history, browsing navigation history, and user selection history, etc. For example, the func flow graph may be created based on the user log shown in FIG. 4.

The user log may include temporal sequences of tasks and funcs users choose to fulfill the tasks. The func importance can then be derived from the user log and the task importance can be derived similarly.

As shown in FIG. 6, from the user log, the func flow graph 600 may be first constructed. In func flow graph 600, each vertex is a func, and funcs are linked to each other if a traversal from one to another has been found consecutively in the user log. The funcs in the func flow graph 600 corresponding to the tasks associated with the user intention. The edge weight is the total count of traversal record, which may be obtained from the user log. Two funcs are consecutive if they happened in sequential order in a user log and within a certain time duration.

Figure 7:
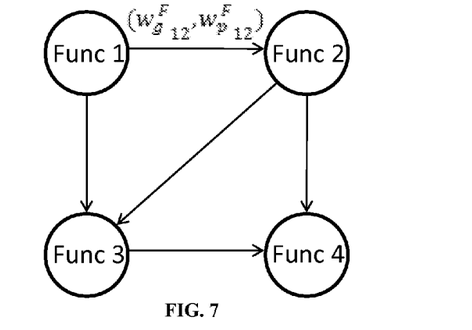
FIG. 7 illustrates an exemplary function flow graph ranking step consistent with the disclosed embodiments.

After the func flow graph 600 is constructed, the func importance may be derived based on the func flow graph 600 using a graph-based ranking algorithm. The traversal frequency may be taken into consideration in the ranking algorithm. FIG. 7 illustrates an exemplary graph-based ranking algorithm.

Because different users may have different navigation preference among funcs, both the general and personal weights are included to enable personalization. As shown in FIG. 7, the general and personal weights are denoted as $w_g^F$ and $w_p^F$, respectively.

The personalized func importance may be defined as follows. Let F be the func set and T be the task set. |F| is the number of funcs and |T| is the number of tasks. For each func $f \in F$, T(f) denotes all the tasks that f can fulfill, and for each task $t \in T$, F(t) denotes all the possible funcs that can implement the task.

For each func $f \in F$, let Prev(f) be the set of funcs that precede f in user log and Post(f) be the set of the funcs that follow f. Let $w_{g_{ij}}^F$ and $w_{p_{ij}}^F$ be the general and personal traversal frequency from func $f_i$ to func $f_j$. The func importance (FR) may be defined as:

$$FR(f_i) = \frac{(1-d)}{|F|} + d \cdot \sum_{j \in Prev(f_i)} \frac{\lambda_f w_{g_{ij}}^F + (1-\lambda_f) w_{p_{ij}}^F}{\sum_{f_k \in Post(f_j)} \left( \lambda_f w_{g_{jk}}^F + (1-\lambda_f) w_{p_{jk}}^F \right)} FR(f_j) \quad (1)$$

Where $\lambda_f \in [0,1]$, determined by empirical experience and set by default or by the user. The task traversal frequency from the user log is used to enhance recommendation accuracy, and the func importance calculation is personalized through $\lambda_f$, which decides how much the personal preference can influence the final result. The func importance is record in each vertex, and the task can be implemented by the func is also included as the parenthesis text in the vertex.

Figure 8:
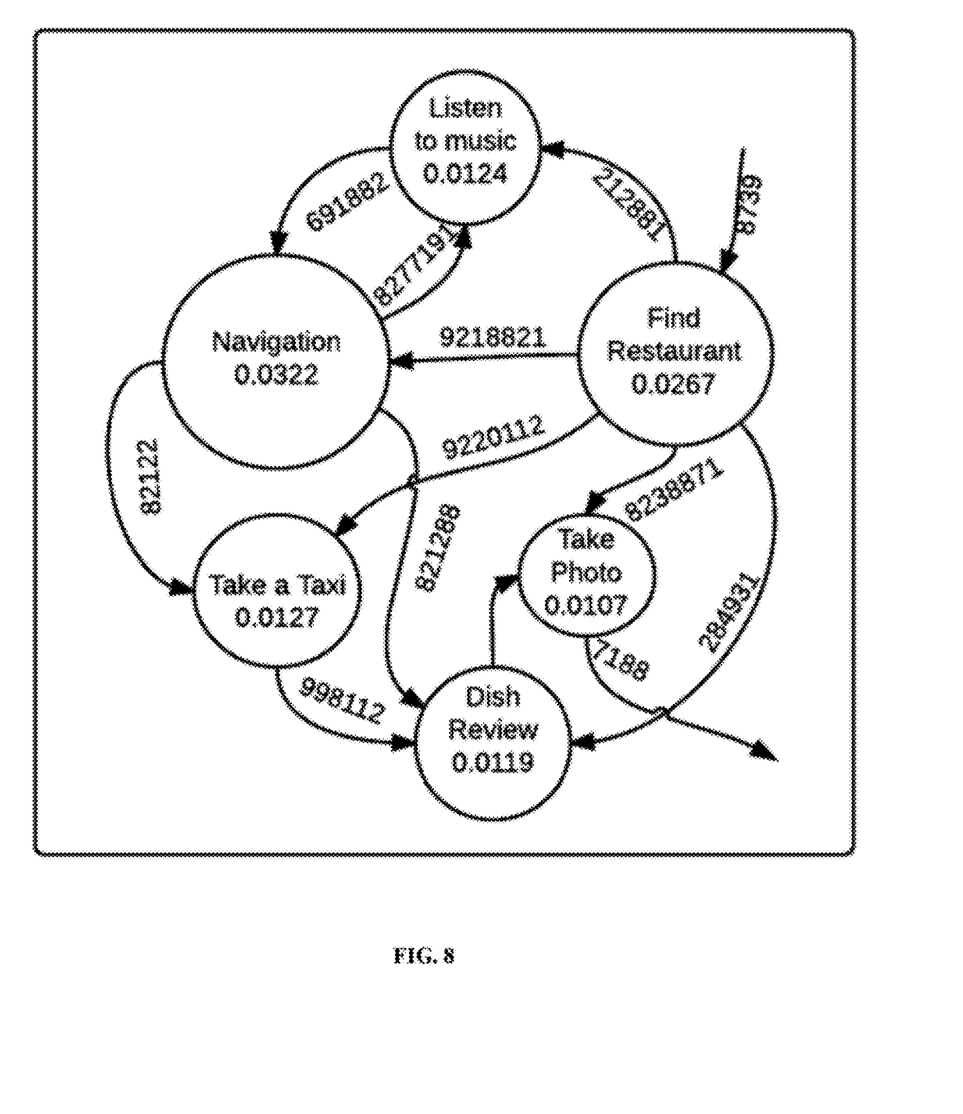
FIG. 8 illustrates an exemplary task flow graph consistent with the disclosed embodiments.
Figure 9:
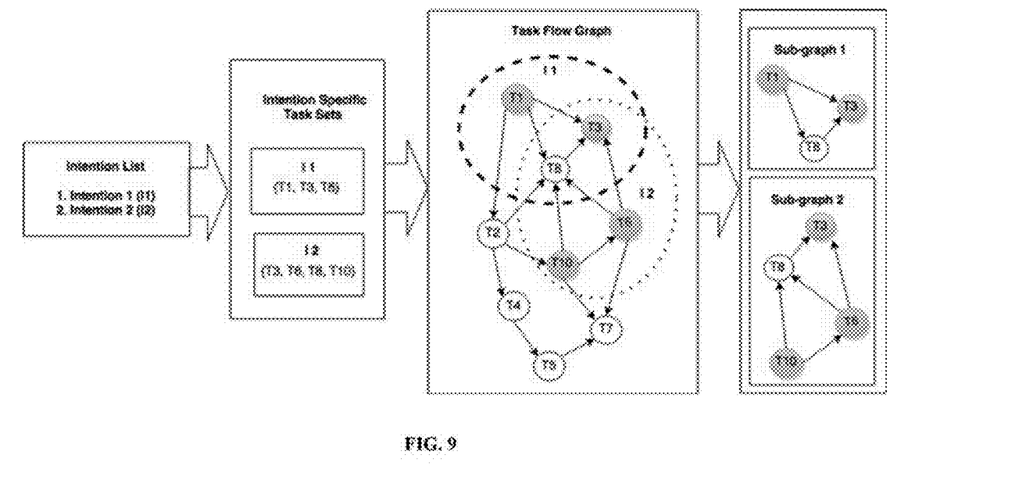
FIGS. 9 and 10 illustrate an exemplary task sequence mining process consistent with the disclosed embodiments.

Similarly, the personalized task flow graph and the personalized task importance may also be learned or derived for all the tasks associated with the user intention (510). For each task t∈T, let Prev(t) be the set of tasks that precede t in user log and Post(t) be the set of the tasks that follow t. Let $$w_{t_{p_{ij}}} \text{ and } w_{t_{g_{ij}}}$$

be the general and personal traversal frequency from task $t_i$ to task $t_j$. The task importance (TR) may be defined as:

$$TR(t_i) = \frac{(1-d)}{|T|} + d \cdot \sum_{j \in Prev(t_i)} \frac{\lambda_t w_{g_{ji}}^T + (1-\lambda_t) w_{p_{ji}}^T}{\sum_{t_k \in Post(t_j)} \left( \lambda_t w_{g_{jk}}^T + (1-\lambda_t) w_{p_{jk}}^T \right)} TR(t_i) \qquad (2)$$

Where $\lambda_t \in [0,1]$, determined by empirical experience and set by default or by the user. FIG. 7 illustrates an exemplary learned task flow graph. As shown in FIG. 7, each vertex represent a task, and the task importance is indicated as the number in each vertex. The task traversal frequency is also shown between different tasks, and such weights of edges of task flow graph can be obtained from the user log. That is, in task flow graph 700, each vertex is a task, and tasks are linked to each other if a traversal from one to another has been found consecutively in the user log. The edge weight is the total count of traversal record, which may be obtained from the user log. Two tasks are consecutive if they happened in sequential order in a user log and within a certain time duration.

Returning to FIG. 5, based on the user intention list obtained from the user intention deduction module and the func and task flow graphs, the ranked func sequence may be generated (512). Specifically, the ranked func sequences may be generated by two parts: task sequence mining and func sequence generation based on the func and task importance.

That is, based on the intention list and the task flow graph, each intention specific task sequences may be mined (e.g., data-mined) through a predetermined algorithm, such as an Extended Floyd Algorithm, and mined results may be put together to form the overall task sequences for the intention list. FIG. 7 and FIG. 8 illustrate exemplary task sequence mining and the ranked task sequence generation.

As shown in FIG. 7, the user intention list includes two intentions, intention 1 (I1), and intention 2 (I2). The intention specific task sets can be obtained from predefined task set (not ordered). For example, for intention I1, the task set is task1 (T1), task3 (T3), and task8 (T8), e.g., I1 has {T1, T3, T8}; and for intention I2, the task set is task3 (T3), task6 (T6), task8 (T8), and task10 (T10), e.g., I2 has {T3, T6, T8, T10}.

Further, based on the user log, the possible starting point and ending point of tasks associated with user intention may be generated. For example, for user intention I1, the starting point is T1 and the ending point is T3; and for user intention I2, the starting points are T10 and T6, and the ending point is T3.

Further, the task flow graph is analyzed, and a sub-graph including the tasks associated with the user intention may be generated, with the starting point and the ending point. The sub-graph may include only the points of relevant tasks. For example, for user intention I1, the sub-graph 1 is generated to include the starting point T1, point T8, and the ending point T3; and for user intention I2, the sub-graph 2 is generated to include the starting points T10 and T6, point T8, and the ending point T3.

In the task flow graph or sub-graph corresponding to the user intention, the edge weight may be defined as $\omega_{ij}$=log $(1/w_{t_{ij}})$. Provided that p(S, E) is defined to be a set of paths for a fixed pair of starting point S and ending point E, the goal is to find the optimal path $p_o(S, E)$ that maximize the multiplied traverse probability of all the segments in the path, that is $$\begin{aligned} p_o(S, E) &= \operatorname{argmax}_{p(S,E)} \left( \prod_{(t_i,t_j) \in p(S,E)} w_{t_{ij}} \right) \\ &= \operatorname{argmin}_{p(S,E)} \left( \prod_{(t_i,t_j) \in p(S,E)} \frac{1}{w_{t_{ij}}} \right) \\ &= \operatorname{argmin}_{p(S,E)} \left( e^{\log\left(\prod_{(t_i,t_j) \in p(S,E)} 1/w_{t_{ij}}\right)} \right) \\ &= \operatorname{argmin}_{p(S,E)} \left( e^{\sum_{(t_i,t_j) \in p(S,E)} \log\left(\frac{1}{w_{t_{ij}}}\right)} \right) \\ &= \operatorname{argmin}_{p(S,E)} \left( e^{\sum_{(t_i,t_j) \in p(S,E)} \omega_{ij}} \right) \\ &= \operatorname{argmin}_{p(S,E)} \sum_{(t_i,t_j) \in p(S,E)} \omega_{ij} \end{aligned}$$

Hence the problem of finding the most probable path can be mapped to finding the shortest path $\Sigma_{(t_i,t_j) \in p} \omega_{ij}$ (because the exponential function is monotonic), which can be solved by, e.g. a Floyd-Warshall algorithm.

Figure 10:
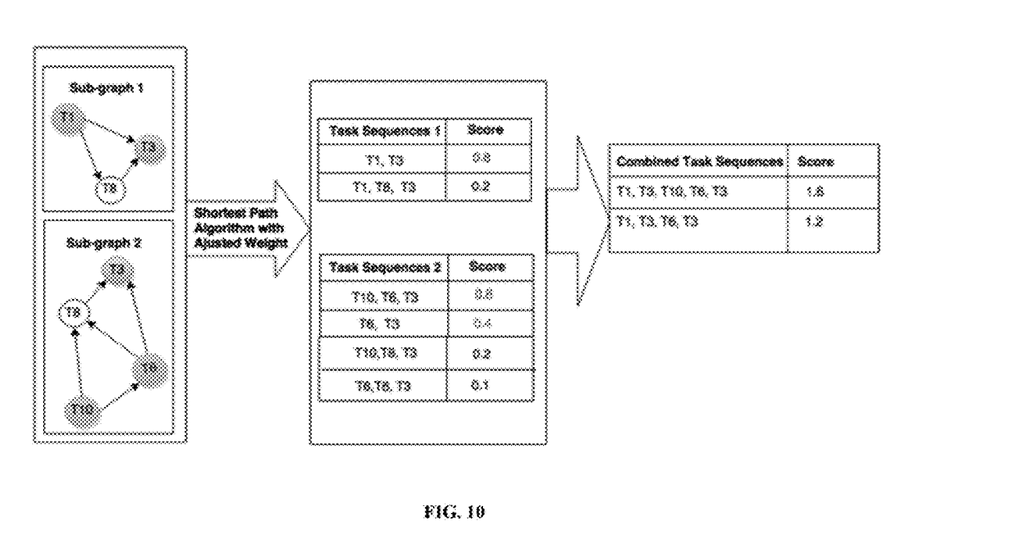

As shown in FIG. 10, in this process, the most probable task sequences for each of the pair of starting and ending tasks may be determined based on the score of the possible task sequences (i.e., probability score). That is, the possible task sequences and associated score may be obtained, and the optimal task sequence (with the highest probability) for this specific pair of starting and ending tasks is chosen. In other words, for each pair of starting and ending points in the sub-graph, an optimal path may be determined. For example, for the sub-graph 1 of the user intention I1, two possible task sequences are used, T1 and T3, and T1, T8, and T3, with scores of 0.8 and 0.2, respectively, and the task sequence T1 and T3 is chosen.

For the sub-graph 2 of the user intention I2, four possible task sequences are used, T10, T6, and T3, with a score of 0.8; T6 and T3, with a score of 0.4; T10, T8, and T3, with scores of 0.2; and T6, T8, and T3, with a score of 0.1, and the task sequences T10, T6, and T3 and T6 and T3 are chosen (i.e., task sequences with a score greater than a predetermined threshold).

Further, the result of the process is constructed by assembling each of the optimal task sequence together. Thus, the top two combined task sequences for the two intentions are T1, T3, T10, T6, and T3, with a score of 1.6, and T1, T3, T6, and T3, with a score of 1.2.

Figure 11:
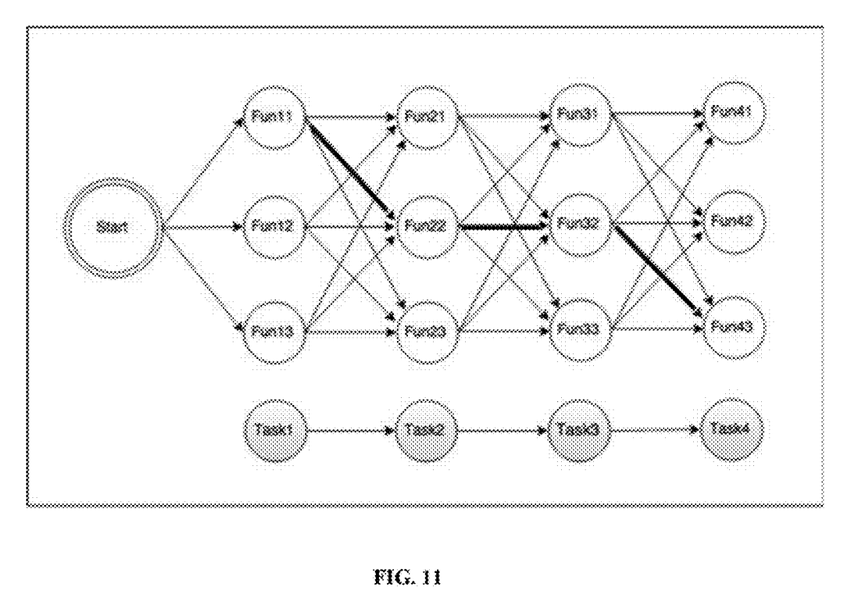
FIG. 11 illustrates an exemplary function sequence mining consistent with the disclosed embodiments.

Returning to FIG. 5, after the desired task sequence is determined, the most likely corresponding func sequence may also be determined (510). For example, a Viterbi Algorithm may be used to determine the most likely sequence of underlying hidden states from an observation states in time order. FIG. 11 illustrates an exemplary derivation process.

As shown in FIG. 11, the observation states may be the tasks, while the hidden states are the funcs. Let $(t_1, t_2, t_3, \ldots t_{[T]})$ denote the observation states (i.e., tasks), and $(f_1, f_2, f_3, \ldots f_{[F]})$ denote the hidden states (i.e., funcs), the transition probability from $f_m$ to $f_n$ ($m, n \in [1, |F|]$) can be calculated as:

$$P(f_n|f_m) = FR(f_m) \cdot w_{mn}^F \cdot FR(f_n) \quad (3)$$

where $w_{mn}^F = \lambda_k w_{g_{mn}}^F + (1-\lambda_k) w_{p_{mn}}^F$ and $\lambda_k \in [0,1]$ The emission probability can be derived from Bayes Theorem as shown in below:

$$p(t_s|f_r) = \frac{p(f_r|t_s) \cdot FR(f_r)}{FR(f_r)} \text{ where} \quad (4)$$

$$p(f_r|t_s) = \begin{cases} 0 & \text{if } f_r \notin F(t_s) \\ \dfrac{FR(f_r)}{\sum_{l \in F(t_s)} FR(f_l)} & \text{if } f_r \in F(t_s) \end{cases} \quad (5)$$

Thus, the result of the derivation process is the func sequence with highest probability.

Returning to FIG. 5, after the desired func sequence is derived, the func sequence or a number of funcs in the func sequence may be recommended to the user to resolve the current needs of the user (514). Once the user selects the func sequence, the system may automatically execute the func sequence, including direct transition from one func to another func. Or if the user selects a particular func or funcs, the system may bring the func or funcs up. The selection of the user, including the sequences used by the user may be logged in the user log, and the FuncRank model may be adjusted periodically based on the user log to improve accuracy of the recommendation.

Thus, by using the disclosed FuncRank model to derive and rank the func sequences according to user text request, the capacity to automatically generate the optimal func sequences for recommendation can be established. Such approach builds upon user historical data for personalization of the func sequence derivation, and an intermediate concept of task is used to bridge the gap between the user intention and final func sequences for recommendation, which enables derivation of optimal func sequences through applications of desired algorithms including the Extended Floyd Algorithm and Viterbi algorithm.

Other steps may be referred to above descriptions with respect to the system for scalable user intent mining. Other applications, advantages, alternations, modifications, or equivalents to the disclosed embodiments are obvious to those skilled in the art.

What is claimed is:

1. A method for recommending a desired func sequence to a user, comprising:
   obtaining, by a hardware processor, a user intention list including at least one user intention;
   separating, by the hardware processor, the user intention into a plurality of tasks, and determining a plurality of funcs, wherein each task is implemented by a subset of funcs of the plurality of funcs, each func is used to represent an access point of an app;
   creating, by the hardware processor, a task flow graph for the plurality of tasks based on user usage data, with each vertex in the task flow graph representing a task and indicating an importance of the task;
   creating, by the hardware processor, a func flow graph based on the user usage data and temporal sequences of the tasks and funcs, with each vertex in the func flow graph representing a func and indicating an importance of the func;
   determining, by the hardware processor, a desired func sequence to fulfil the user intention based on the user usage data, the task flow graph, and the func flow graph; and
   recommending, by the hardware processor, the desired func sequence to the user, wherein: two vertexes in the func flow graph are linked to each other if a traversal from one to another has been found consecutively in the user usage data; and
   any two vertexes in the func flow graph are consecutively linked if two funcs of the two vertexes happened in sequential order in the user usage data within a certain time duration; and
   an edge weight between any two vertexes in the func flow graph is a total count of recorded traversal between the two vertexes.

2. The method according to claim 1, further including:
   obtaining, by the hardware processor, a user text request as an input from the user to indicate the user intention; and
   deducting, by the hardware processor, the intention list from the user text request.

3. The method according to claim 1, wherein:
   the importance of the func is calculated based on general traversal frequencies from the func to every other funcs, and personal traversal frequencies from the func to every other funcs.

4. The method according to claim 1, wherein:
   two vertexes in the task flow graph are linked to each other if a traversal from one to another has been found consecutively in the user usage data;
   any two vertexes in the task flow graph are consecutively linked if those two tasks of the two vertexes happened in sequential order in the user usage data within a certain time duration; and
   an edge weight between any two vertexes in the task flow graph is a total count of recorded traversal between the two vertexes.

5. The method according to claim 1, wherein:
   the importance of the task is calculated based on general traversal frequencies from the task to every other tasks, and personal traversal frequencies from the task to every other tasks.

6. The method according to claim 1, wherein determining the desired func sequence further includes:
   determining a starting point and an ending point of tasks associated with each user intention of the intention list;
   generating a sub-graph containing the plurality tasks including the starting point and ending point of tasks; and
   determining a most probable task sequence for each pair of the starting point and ending point of tasks.

7. The method according to claim 6, wherein determining the most probable task sequence further includes:

determining a most probable task sequence for each pair of the starting point and ending point of tasks based on an Extended Floyd Algorithm.

8. The method according to claim 6, further including: determining a desired task sequence of the intention list based on the most probable task sequence for each pair of the starting point and ending point of tasks.

9. The method according to claim 8, further including: determining a corresponding desired func sequence based on the desired task sequence of the intention list.

10. The method according to claim 9, wherein determining the corresponding desired func sequence further includes:
determining a corresponding desired func sequence based on the desired task sequence of the intention list using a Viterbi algorithm, with the tasks as the observation states and the funcs as the hidden states.

11. A system for recommending a desired func sequence to a user, comprising:
at least a memory for storing user usage data; and
a hardware processor coupled to the memory and configured to:
obtain a user intention list including at least one user intention;
separate the user intention into a plurality of tasks, and determine a plurality of funcs, wherein each task is implemented by a subset of funcs of the plurality of funcs, each func is used to represent an access point of an app;
create a task flow graph for the plurality of tasks based on the user usage data, with each vertex in the task flow graph representing a task and indicating an importance of the task;
create a func flow graph based on the user usage data and temporal sequences of the tasks and funcs, with each vertex in the func flow graph representing a func and indicating an importance of the func;
determine a desired func sequence to fulfil the user intention based on the user usage data, the task flow graph, and the func flow graph; and
recommend the desired func sequence to the user, wherein: two vertexes in the func flow graph are linked to each other if a traversal from one to another has been found consecutively in the user usage data;
any two vertexes in the func flow graph are consecutively linked if two funcs of the two vertexes happened in sequential order in the user usage data within a certain time duration; and
an edge weight between any two vertexes is a total count of recorded traversal between the two vertexes.

12. The system according to claim 11, wherein:
the importance of the func is calculated based on general traversal frequencies from the func to every other funcs, and personal traversal frequencies from the func to every other funcs.

13. The system according to claim 11, wherein:
two vertexes in the task flow graph are linked to each other if a traversal from one to another has been found consecutively in the user usage data;
any two vertexes in the task flow graph are consecutively linked if those two tasks of the two vertexes happened in sequential order in the user usage data within a certain time duration; and
the importance of the task is calculated based on general traversal frequencies from the task to every other tasks, and personal traversal frequencies from the task to every other tasks.

14. The system according to claim 11, wherein, to determine the desired func sequence, the hardware processor is further configured to:
determine a starting point and an ending point of tasks associated with each user intention of the intention list;
generate a sub-graph containing the plurality tasks including the starting point and ending point of tasks; and
determine a most probable task sequence for each pair of the starting point and ending point of tasks.

15. The system according to claim 14, wherein, to determine the most probable task sequence, the hardware processor is further configured to:
determine a most probable task sequence for each pair of the starting point and ending point of tasks based on an Extended Floyd Algorithm.

16. The system according to claim 14, wherein the hardware processor is further configured to:
determine a desired task sequence of the intention list based on the most probable task sequence for each pair of the starting point and ending point of tasks.

17. The system according to claim 16, wherein the hardware processor is further configured to:
determine a corresponding desired func sequence based on the desired task sequence of the intention list.

18. The system according to claim 17, wherein, to determine the corresponding desired func sequence, the hardware processor is further configured to:
determine a corresponding desired func sequence based on the desired task sequence of the intention list using a Viterbi algorithm, with the tasks as the observation states and the funcs as the hidden states.

* * * * *